United States Patent
Ezroni et al.

(10) Patent No.: US 6,720,890 B1
(45) Date of Patent: Apr. 13, 2004

(54) AIRCRAFT COMMUNICATION SYSTEM

(76) Inventors: Ehud Ezroni, 53 David Hamelech Boulevard, Tel Aviv (IL), 64237; Gilad Dafna, 61 Hagana Street, Raanana (IL), 43422

( * ) Notice: Subject to any disclaimer, the term of this patent is extended or adjusted under 35 U.S.C. 154(b) by 0 days.

(21) Appl. No.: 09/743,322

(22) PCT Filed: Jul. 5, 1999

(86) PCT No.: PCT/IL99/00362

§ 371 (c)(1),
(2), (4) Date: Mar. 15, 2001

(87) PCT Pub. No.: WO00/03366

PCT Pub. Date: Jan. 20, 2000

(30) Foreign Application Priority Data

Jul. 9, 1998 (IL) .................................... 125289

(51) Int. Cl.$^7$ .............................................. G08B 21/00
(52) U.S. Cl. ................... 340/945; 340/971; 701/301; 704/220; 704/275; 455/79
(58) Field of Search ................ 340/988, 945, 340/971, 975; 701/301, 302, 120; 704/220, 235, 260, 274, 275; 345/327, 8, 73; 455/79, 151.1, 151.2; 379/52, 93.18, 93.27; 342/30; 375/142

(56) References Cited

U.S. PATENT DOCUMENTS

| | | | |
|---|---|---|---|
| 3,369,239 A | 2/1968 | Perkinson et al. .......... 342/456 |
| 4,086,632 A | 4/1978 | Lions ........................ 701/210 |
| 4,196,474 A | 4/1980 | Buchanan et al. .......... 701/301 |
| 4,426,733 A | 1/1984 | Brenig ........................ 455/79 |
| 4,437,085 A | 3/1984 | Salant .................... 340/286.14 |
| 4,675,676 A | 6/1987 | Takanabe et al. ........... 340/995 |
| 4,725,956 A | 2/1988 | Jenkins .......................... 701/2 |
| 4,823,272 A | 4/1989 | Inselberg .................... 701/301 |
| 4,975,957 A | 12/1990 | Ichikawa et al. ........... 704/220 |
| 5,025,382 A | 6/1991 | Artz ........................... 701/120 |
| 5,155,741 A | 10/1992 | Waters et al. ................ 375/142 |
| 5,227,786 A | 7/1993 | Hancock ..................... 340/961 |
| 5,528,739 A | 6/1996 | Lucas et al. ................. 715/526 |
| 5,577,165 A | 11/1996 | Takebayashi et al. ....... 704/275 |
| 5,677,739 A | 10/1997 | Kirkland ..................... 348/468 |
| 5,684,498 A | 11/1997 | Welch et al. ................... 345/8 |
| 5,703,591 A | 12/1997 | Tognazzini ................... 342/30 |
| 5,714,948 A | 2/1998 | Farmakis et al. ........... 340/961 |
| 5,742,508 A | 4/1998 | Kusui et al. ................. 701/120 |
| 5,809,112 A | 9/1998 | Ryan ........................... 379/52 |
| 5,890,079 A | * 3/1999 | Levine ......................... 701/14 |
| 5,926,790 A | 7/1999 | Wright ........................ 704/275 |
| 6,044,322 A | * 3/2000 | Stieler ........................ 701/120 |
| 6,161,097 A | * 12/2000 | Glass et al. ..................... 705/6 |

* cited by examiner

Primary Examiner—Benjamin C. Lee
(74) Attorney, Agent, or Firm—Nixon & Vanderhye P.C.

(57) ABSTRACT

A system and method for providing unambiguous communication between a pilot of an aircraft (18) and at least one other communicator. The system includes a communication link (14, 16) enabling communication between the pilot and the at least one other communicator, and a visually sensible display (12, 20) providing a visually sensible output indication to at least one of the pilot and the at least one other communicator voice and data information communicated along said communication link.

89 Claims, 7 Drawing Sheets

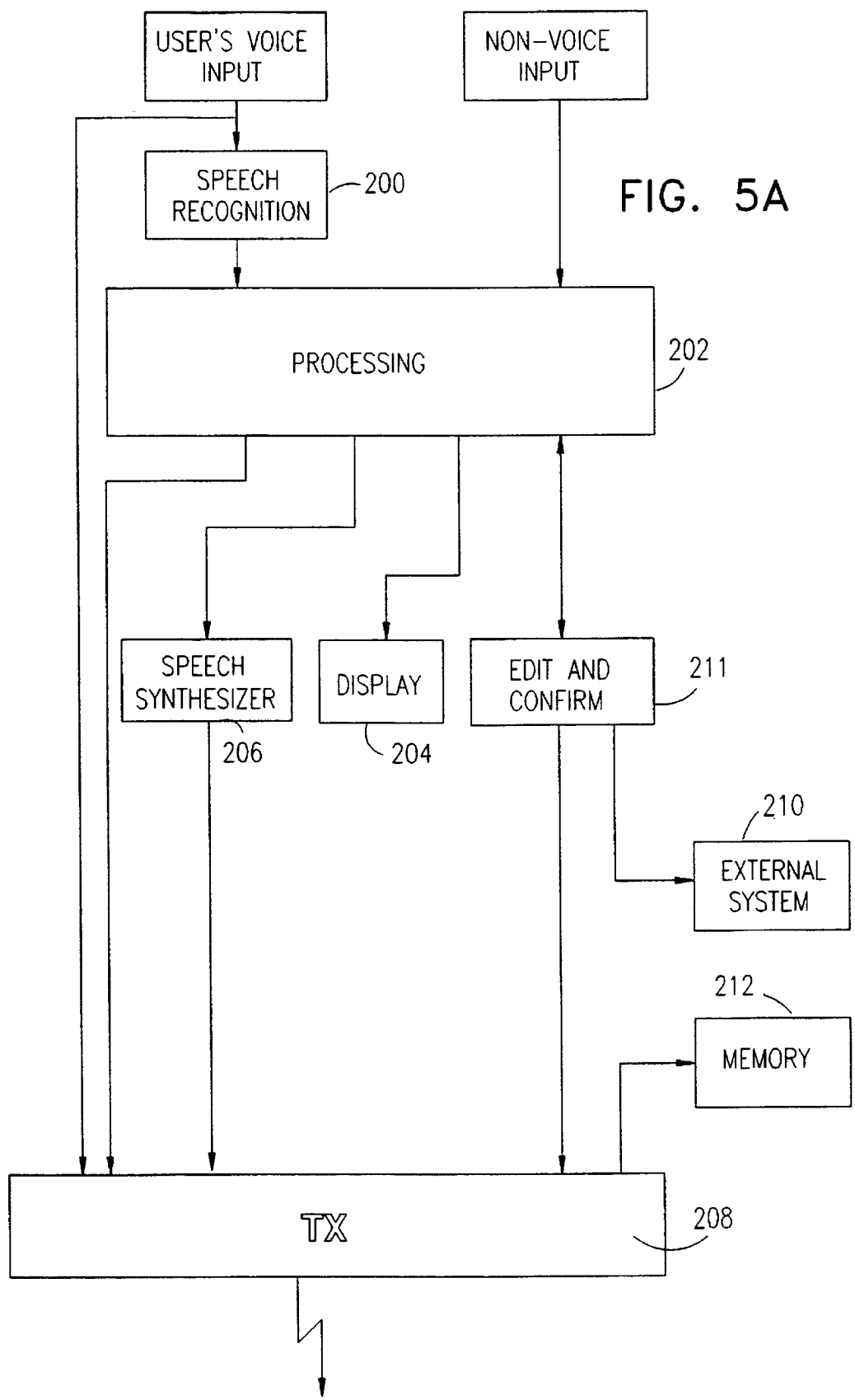

AIRCRAFT COMMUNICATION SYSTEM

BACKGROUND OF THE INVENTION

Problems of miscommunication between air controllers and pilots have resulted in serious accidents and substantial loss of life and monetary loss. The present invention seeks to overcome existing problems of miscommunication.

The following U.S. Patents are believed to represent the state of the art, but are not believed to provide a suitable solution to problems of miscommunication between air controllers and pilots: U.S. Pat. Nos. 5,703,591; 5,684,498; 5,227,786; 5,025,382; 4,675,676; 4,437,085; 4,086,632 and 3,369,239.

SUMMARY OF THE INVENTION

The present invention seeks to provide a solution to problems of miscommunication between air controllers and pilots.

There is thus provided in accordance with a preferred embodiment of the present invention a system for providing unambiguous communication between an aircraft pilot and at least one other communicator, the system including a communication link enabling communication between the at least one pilot and the at least one other communicator, and a visually sensible display providing a visually sensible output indication to at least one of other communicator and the pilot of information communicated along the communication link.

There is also provided in accordance with accordance with another preferred embodiment of the present invention a system for providing unambiguous communication between an aircraft pilot and at least one other communicator along a communication link, the system including an interface with the communication link, and a visually sensible display receiving information transmitted between the aircraft pilot and the at least one other communicator along the communication link via the interface and providing a visually sensible output indication to at least one of other communicator and the pilot of information communicated along the communication link.

There is also provided in accordance with yet another preferred embodiment of the present invention a system for providing unambiguous communication between an aircraft pilot and at least one other communicator along a communication link in an environment including a display the system including an interface with the communication link, and circuitry operating a visually sensible display receiving information transmitted between the aircraft pilot and the at least one other communicator along the communication link via the interface and providing a visually sensible output indication to at least one of other communicator and the pilot of information communicated along the communication link.

Further in accordance with a preferred embodiment of the present invention the display is located within a field of view of a pilot and is operative to display information communicated from an aircraft controller to the pilot.

Still further in accordance with a preferred embodiment of the present invention the display is located within a field of view of a pilot and is operative to display information communicated from another pilot to the pilot.

Additionally in accordance with a preferred embodiment of the present invention the display is located within a field of view of an aircraft controller and is operative to display information communicated from a pilot to the aircraft controller.

Preferably the system also includes a microphone for receiving a voice input to be transmitted over the communication link. Additionally or alternatively the system also includes a speech recognizer for deriving information from the voice input received by the microphone.

Still further in accordance with a preferred embodiment of the present invention also including a speech output device associated with said display for providing a speech output generally simultaneously with the visually sensible output indication to at least one of the other communicator and the pilot of information communicated along the communication link.

Additionally in accordance with a preferred embodiment of the present invention also including a speech synthesizer associated with the display for providing a synthesized speech output generally simultaneously with the visually sensible output indication to at least one of the other communicator and the pilot of information communicated along the communication link.

Further in accordance with a preferred embodiment of the present invention also including a speech synthesizer associated with the display for providing a synthesized voice output generally simultaneously with the visually sensible output indication to at least one of the other communicator and the pilot of information communicated along the communication link, the speech synthesizer receiving an input in data form from the communication link.

Preferably the speech synthesizer associated with the display for providing a synthesized voice output generally simultaneously with the visually sensible output indication to at least one of the aircraft controller and the pilot of information communicated along the communication link, the speech synthesizer receiving a digital information output from the speech recognizer.

The communication link carries speech. Additionally or alternatively the communication link carries information derived from speech.

Moreover in accordance with a preferred embodiment of the present invention also including a memory for storing at least part of the information communicated along said communication link.

Preferably the system also includes interface apparatus linking the system to external aviation-related systems for at least one of monitoring and control of the operation thereof Further in accordance with a preferred embodiment of the present invention the communication link comprises a multiple channel link and the display is capable of displaying information received simultaneously along multiple channels.

Still further in accordance with a preferred embodiment of the present invention also including a post flight analyzer utilizing at least part of the information communicated along the communication link.

Additionally in accordance with a preferred embodiment of the present invention also including a post event analyzer utilizing at least part of the information communicated along the communication link.

There is also provided in accordance with a preferred embodiment of the present invention a method for providing unambiguous communication between an aircraft pilot and at least one other communicator, the method including enabling communication between the at least one pilot and the at least one other communicator along a communication link, and providing a visually sensible output indication on a display to at least one of other communicator and the pilot of information communicated along the communication link.

There is also provided in accordance with yet another preferred embodiment of the present invention a method for providing unambiguous communication between an aircraft pilot and at least one other communicator along a communication link, the method including interfacing with the communication link, and providing a visually sensible display of information transmitted between the aircraft pilot and the at least one other communicator along the communication link to at least one of other communicator and the pilot of information communicated along the communication link.

There is provided in accordance with another preferred embodiment of the present invention a method for providing unambiguous communication between an aircraft pilot and at least one other communicator along a communication link in an environment including a display the system including interfacing the communication link, and operating a visually sensible display receiving information transmitted between the aircraft pilot and the at least one other communicator along said communication link via the interface and providing a visually sensible output indication to at least one of other communicator and the pilot of information communicated along the communication link.

Further in accordance with a preferred embodiment of the present invention the display is located within a field of view of a pilot and is operative to display information communicated from an aircraft controller to the pilot.

Still further in accordance with a preferred embodiment of the present invention the display is located within a field of view of an aircraft controller and is operative to display information communicated from a pilot to the aircraft controller.

Additionally in accordance with a preferred embodiment of the present invention the display is located within a field of view of a pilot and is operative to display information communicated from another pilot to the pilot.

Moreover in accordance with accordance with a preferred embodiment of the present invention also including receiving a voice input to be transmitted over the communication link. Preferably also including deriving information from the voice input.

Still further in accordance with a preferred embodiment of the present invention also including providing a speech output generally simultaneously with the visually sensible output indication to at least one of the other communicator and the pilot of information communicated along the communication link.

Further in accordance with a preferred embodiment of the present invention also including providing a synthesized speech output generally simultaneously with the visually sensible output indication to at least one of the other communicator and the pilot of information communicated along the communication link.

Additionally in accordance with a preferred embodiment of the present invention also including providing a synthesized voice output generally simultaneously with the visually sensible output indication to at least one of the other communicator and the pilot of information communicated along the communication link, in response to a received input in data form from the communication link.

Preferably the method also including providing a synthesized voice output generally simultaneously with the visually sensible output indication to at least one of the aircraft controller and the pilot of information communicated along the communication link in response to a digital information output from the speech recognizer.

Preferably the communication link carries speech.

Additionally or alternatively the communication link carries information derived from speech.

Further in accordance with a preferred embodiment of the present invention also including a memory for storing at least part of the information communicated along the communication link. Preferably the method also including linking the communication link to external aviation-related systems for at least one of monitoring and control of the operation thereof.

Further in accordance with a preferred embodiment of the present invention the communication link includes a multiple channel link and the display is capable of displaying information received simultaneously along multiple channels.

Still further in accordance with a preferred embodiment of the present invention also including utilizing at least part of the information communicated along the communication link for post-flight analysis.

Moreover in accordance with a preferred embodiment of the present invention also including utilizing at least part of the information communicated along the communication link for post-event analysis.

BRIEF DESCRIPTION OF THE DRAWINGS

The present invention will be understood and appreciated more fully from the following detailed description, taken in conjunction with the drawings in which:

FIGS. 5A and 5B are together a simplified block diagram flow chart illustrating operation of the system of FIGS. 1, 4A and 4B.

DETAILED DESCRIPTION OF PREFERRED EMBODIMENTS

Figure 1:
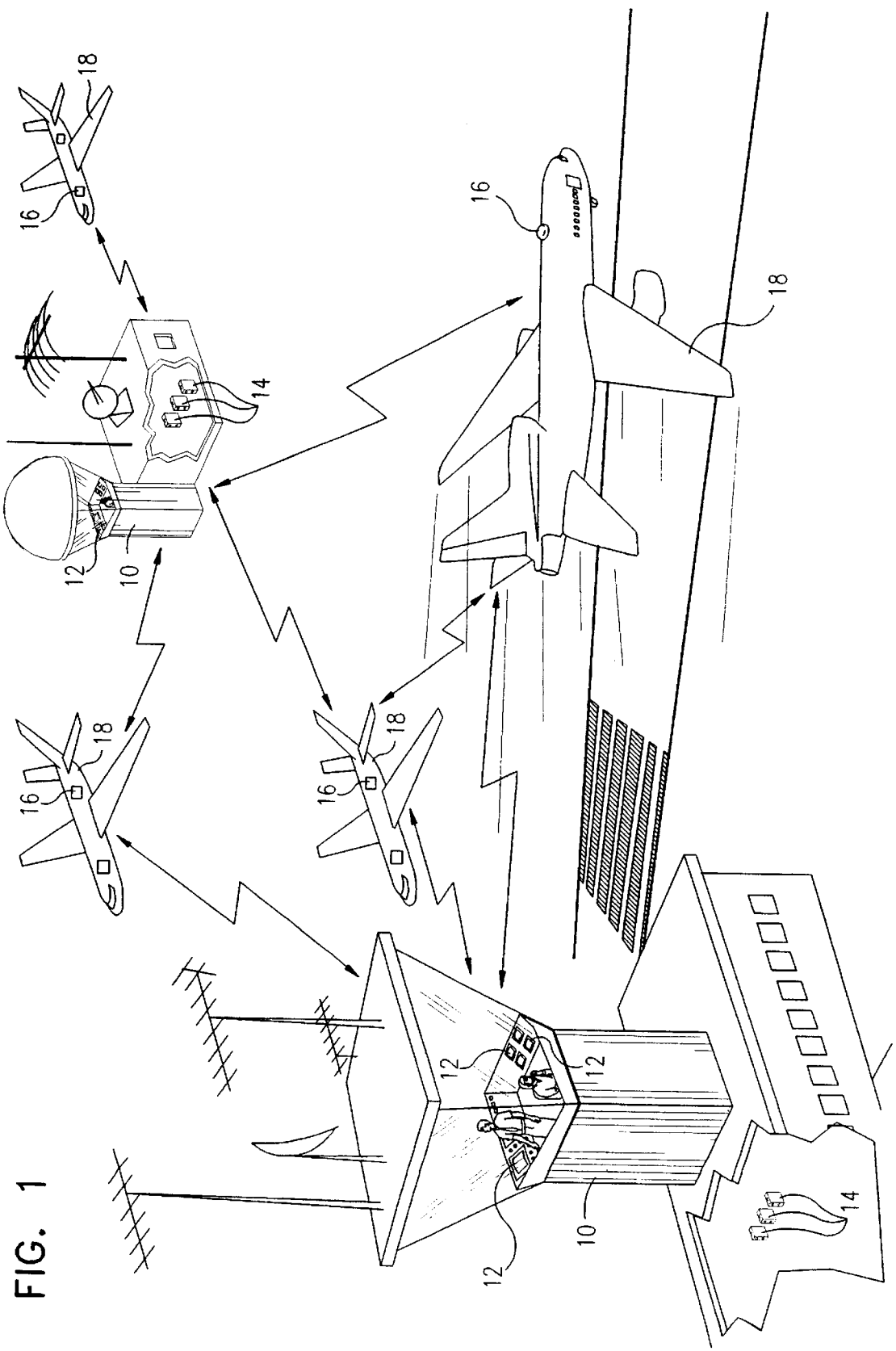
FIG. 1 is a simplified pictorial illustration of an aircraft communication system constructed and operative in accordance with a preferred embodiment of the present invention.

Reference is now made to FIG. 1, which is a simplified pictorial illustration of an aircraft communication system constructed and operative in accordance with a preferred embodiment of the present invention.

The aircraft communications system of the present invention typically comprises at least one aircraft control center 10 which houses a plurality of aircraft controller stations 12. The aircraft controller stations are coupled via suitable circuitry to one or more aircraft communication transceivers 14 which communicate with airborne transceivers 16 mounted in aircraft 18. Within the definition of aircraft controller stations 12 are included radio stations and transponder stations that mediate communications between pilots and controllers.

In accordance with a preferred embodiment of the present invention, there is associated with at least one and preferably both of each aircraft controller station 12 and each aircraft transceiver 16, a visually sensible display providing a visually sensible output indication of information communicated along the communication link.

Figure 2:
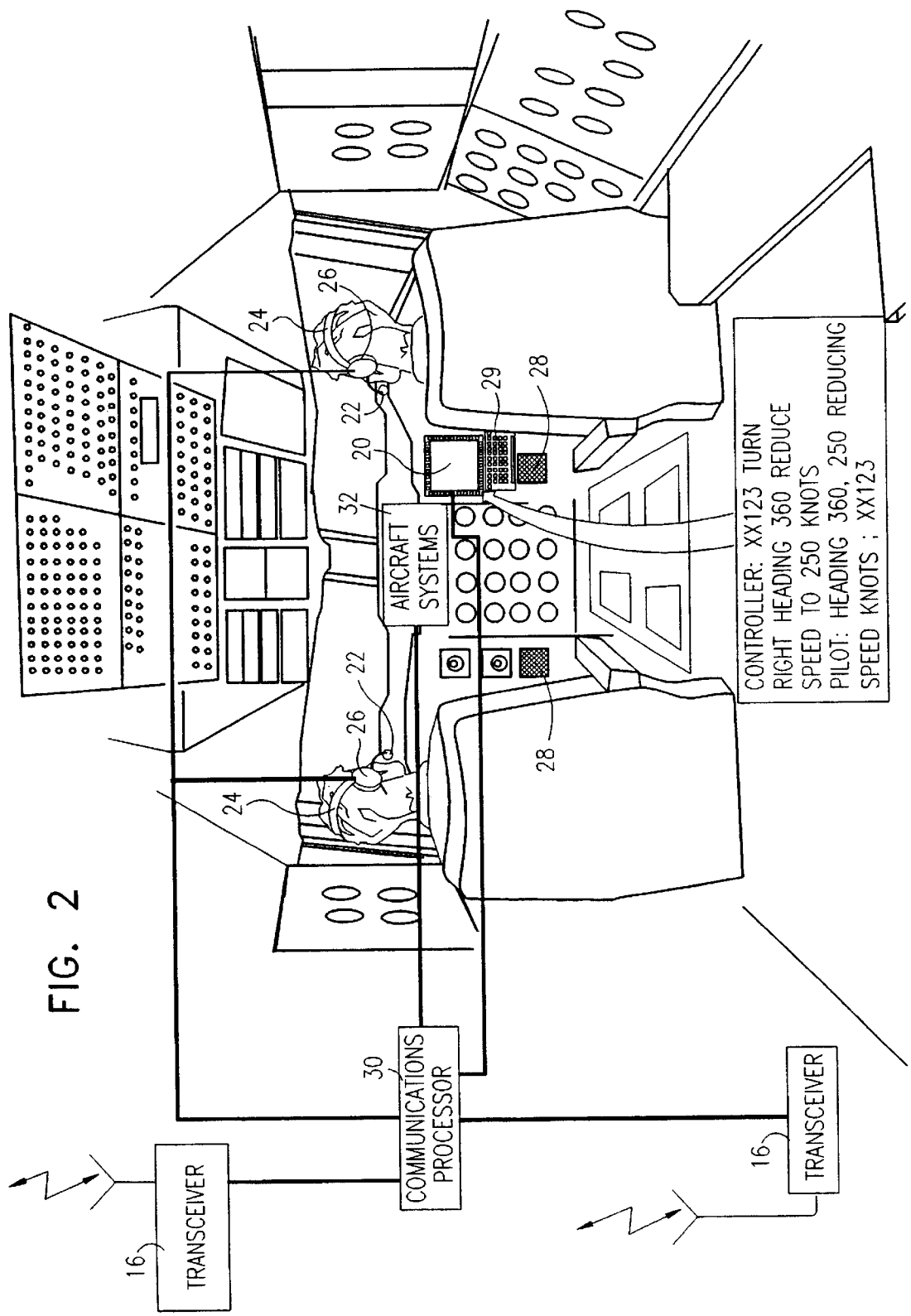
FIG. 2 is a simplified illustration of the interior of an aircraft cockpit including part of the system of FIG. 1.

In accordance with a preferred embodiment of the invention, and as shown in FIG. 2 a display 20 is located within a field of view of the aircraft pilot within the cockpit and is operative to display information communicated to the pilot. Normally the pilot receives communications not only from the aircraft controller but also intercepts communications between other aircraft and the aircraft controller. All of these communications may be displayed on display 20. Preferably a microphone 22 is also provided on a pilot's headset 24 for receiving a pilot voice input to be transmitted over the communication link. The pilot's headset also preferably includes a earpiece 26 for providing an audio output to the pilot. A loudspeaker 28 may also be provided in the cockpit. An information input device 29, such as a keyboard, mouse, electronic pen or the like may also be provided.

The display 20 as well as the microphone 22, earpiece 26, loudspeaker 28 and information input device 29 are all preferably coupled to a communications processor 30. The communications processor 30 is coupled to one or more transceivers 16 (FIGS. 1 and 2).

In accordance with a preferred embodiment of the present invention, the communications processor 30 may be coupled to various aircraft systems 32, both for receiving inputs directly therefrom and for providing control outputs thereto. These aircraft systems may include, for example, an autopilot, which could receive control inputs and provide outputs regarding the orientation and location of the aircraft and an autothrottle which could be controlled by an output from the communications processor 30 and could provide a feedback output to the communications processor of actions taken.

Figure 3:
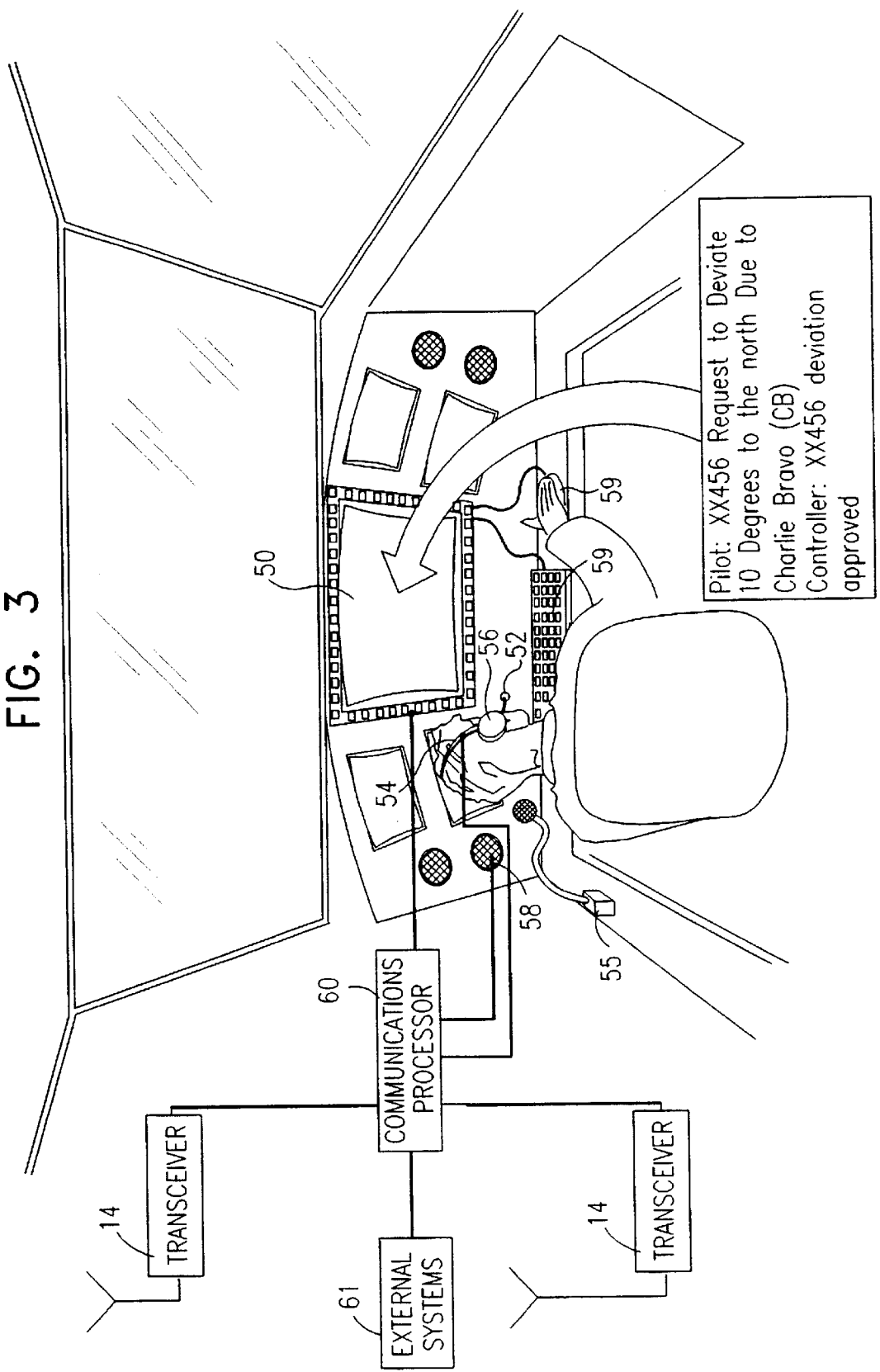
FIG. 3 is a simplified illustration of an aircraft controller station including part of the system of FIG. 1.

As shown in FIG. 3, additionally or alternatively, a display 50 is located within a field of view of the aircraft controller and is operative to display information communicated from a pilot to the aircraft controller. Preferably a microphone 52 is also provided on a controller's headset 54 for receiving a controller's voice input to be transmitted over the communication link. The controller's headset 54 also preferably includes an earpiece 56 for providing an audio-output to the pilot. A loudspeaker 58 may also be provided in the controller station. An information input device 59, such as a keyboard, mouse, electronic pen or the like may also be provided.

The display 50 as well as the microphone 52, earpiece 56, loudspeaker 58 and information input device 59 are all preferably coupled to a communications processor 60. The communications processor 60 is coupled to one or more transceivers 14 (FIGS. 1 and 2).

In accordance with a preferred embodiment of the present invention, the communications processor 60 may be coupled to various controller related systems, both for receiving inputs directly therefrom and for providing control outputs thereto. These controller related systems may include, for example, runway lights, which could receive control inputs and provide feedback outputs and radar inputs which could be transmitted directly to pilots.

Figure 4A:
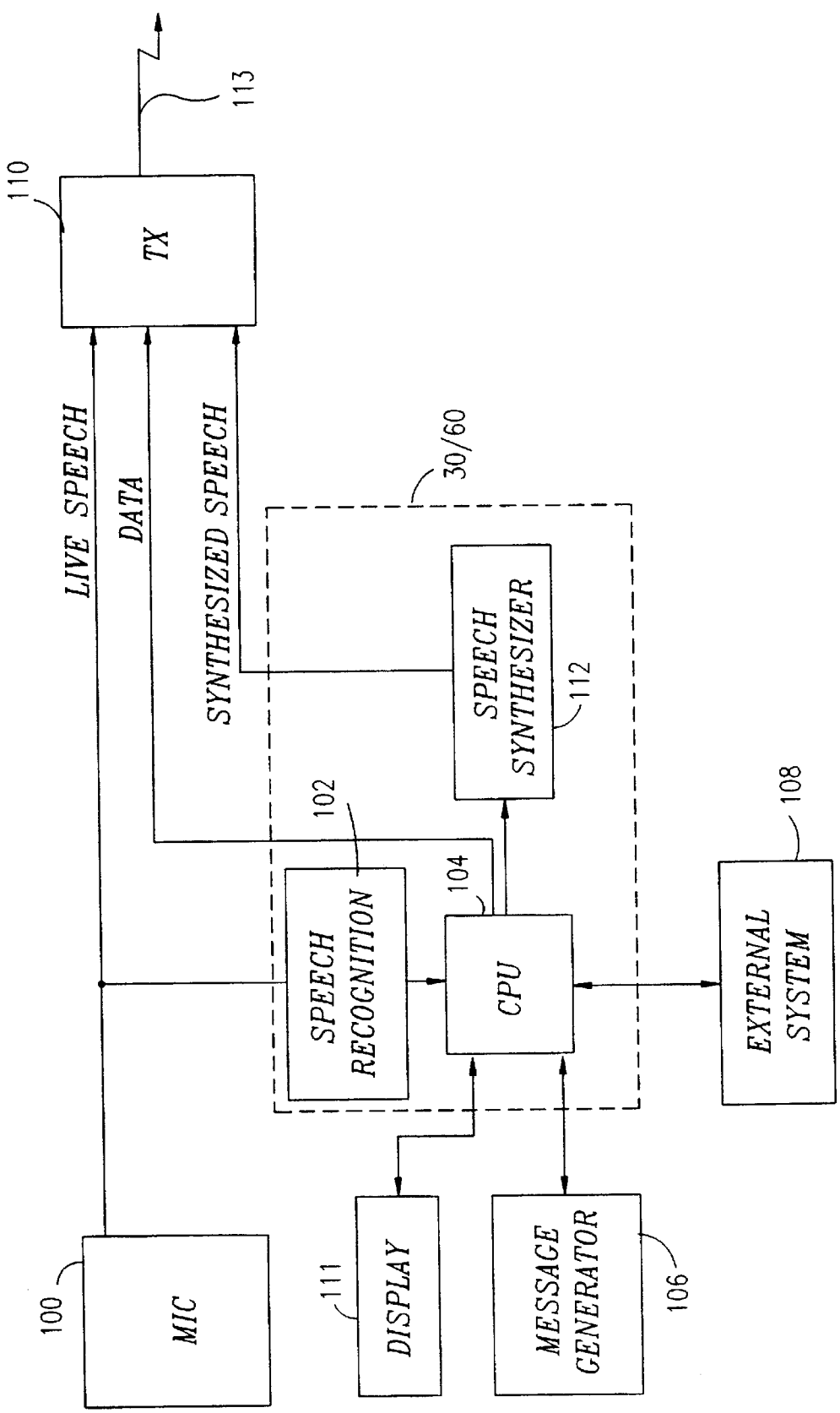
FIGS. 4A and 4B are together a simplified block diagram illustrating the system of FIG. 1 in accordance with a preferred embodiment of the present invention.

Reference is now made to FIG. 4A, which illustrates a transmit end of the system of FIG. 1 in accordance with a preferred embodiment of the present invention. A transmit end of the type described hereinbelow with reference to FIG. 4A may be located at either and preferably both of an airplane cockpit and a controller station.

A microphone or other voice input device 100 preferably provides a speech output to speech recognition circuitry 102 which provides an information output to a computer processor 104. The computer processor 104 may also receive information inputs from additional sources, such as a computerized message generator 106, and may both receive information inputs and output control outputs to various external systems, such as aviation related systems, including, for example, avionics of an aircraft or various airport systems.

Microphone 100 may additionally provide a voice output directly to a transmitter 110 which transmits over a wireless communication link 112.

The computer processor 104 may provide a data output directly to transmitter 110. Alternatively or additionally, the computer processor 104 may provide a data output to a speech synthesizer 112 which provides a synthesized speech output to transmitter 110 for transmittal over communication link 112. Additionally or alternatively, processor 104 may provide a data output to additional apparatus, such as aviation related systems such as aircraft avionics or ground systems, for example, runway lights.

Figure 4B:
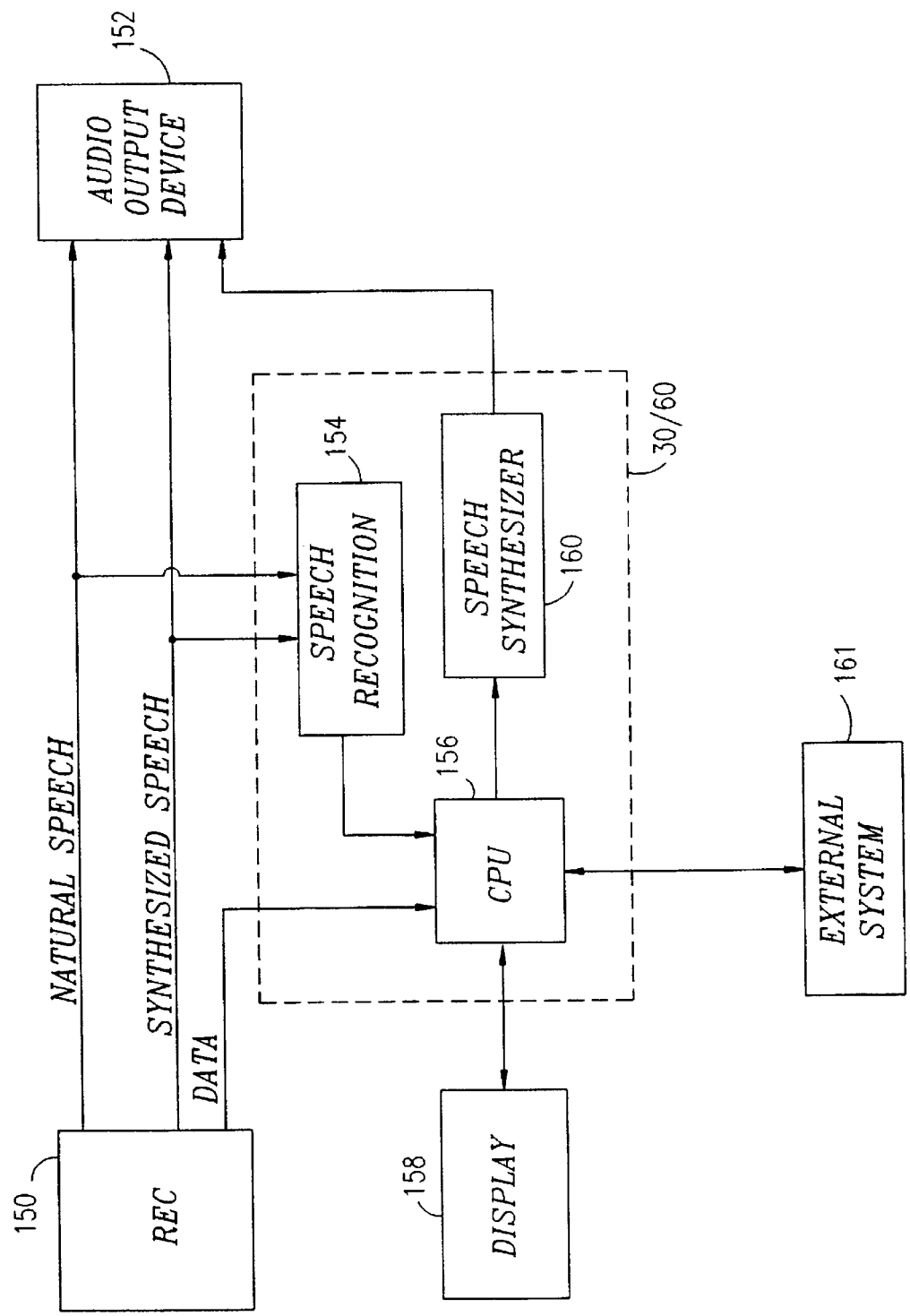

Reference is now made to FIG. 4B, which illustrates a receive end of the system of FIG. 1 in accordance with a preferred embodiment of the present invention. A receive end of the type described hereinbelow with reference to FIG. 4A may be located at either and preferably both of an airplane cockpit and a controller station.

A receiver 150, which typically forms part of transceiver 14 or transceiver 16 (FIG. 1) provides at least one and preferably three outputs: natural voice, as transmitted over the communication link typically in analog form but possibly in digital form, synthesized speech and data. The natural speech may be output directly to an audio output device 152, such as a earpiece or loudspeaker. Additionally or alternatively, the natural speech may be supplied as an input to voice recognition circuitry 154.

The synthesized speech may be output directly via the audio output device 152. Additionally or alternatively, the synthesized speech may be supplied as an input to speech recognition circuitry 154. Alternatively, the synthetic speech may be separately processed by a synthetic speech decoder (not shown).

The voice recognition circuitry 154 preferably outputs to a processor 156, which also may receive a data input from receiver 150. The processor 156 may employ the natural speech or the synthesized speech to provide a visual output indication of the information content of the received speech to a display 158, such as display 20 (FIG. 2) or display 50 (FIG. 3).

Similarly, the processor 156 may employ data received from receiver 150 to provide a visual output indication of the information content of the received data to display 158. Additionally, the processor 156 may transmit signals derived from the data or natural speech received from receiver 150 to a voice synthesizer 160 in order to provide a synthesized speech output at audio output device 152.

It is a further particular feature of the present invention that the processor 156 may process the information content of the natural speech, the synthesized speech or the data to provide control outputs to external systems 108 (FIG. 4A), such as, for example, an autopilot, which could receive control inputs and provide outputs regarding the orientation and location of the aircraft and an autothrottle which could be controlled by an output from the communications processor 30 and could provide a feedback output to the communications processor of actions taken.

The information content of information received from the external systems could also be displayed on display 158 and annunciated by audio output device 152.

It is appreciated that elements 154, 156 and 158 are typically embodied in a communications processor, such as processor 30 (FIG. 2) or processor 60 (FIG. 3).

Reference is now FIG. 5A, which is a flowchart illustrating typical operation of the system of FIGS. 1–4B for message transmission. For a voice generated transmission, the user, before he begins to speak, preferably operates a switch which determines whether the resulting transmission is to be immediate or delayed. Such a switch is typically located on a hand-held microphone or alternatively at any other suitable location in the environment of the user.

The voice of the user is supplied to speech recognition circuitry 200 and may, additionally, be supplied in parallel in its natural voice form for transmission over a communication link.

The output of the speech recognition circuitry 200 may be processed by a processor 202 and displayed by a display 204, transmitted or otherwise utilized as data. Alternatively or additionally, the output of the speech recognition circuitry 200 may be supplied, preferably via processor 202, to a speech synthesizer 206, which generates a synthetic speech output. This synthetic voice output may be transmitted over a communication link, by a transmitter 208.

When the output of the speech recognition circuitry 200 is processed and displayed, the user may, by operation of suitable switches, confirm that the data thus derived from his voice input may be transmitted over the communication link, or, for example, communicated to an external system 210, such as, aircraft avionics.

Normally in all cases other than when natural or synthetic speech is transmitted, the transmission is delayed in order to permit editing of the information and confirmation thereof by the user. A delay may also, optionally, be applied to one or both of natural speech and synthetic transmissions.

Non-voice generated transmissions may be provided by using a keypad or any other data entry device in association with a message generator, such as message generator 106 (FIG. 4A). The non-voice generated transmissions may provide synthetic speech outputs as well as data outputs. Non-voice generated transmissions are normally delayed transmissions and involve processing by processor 202, display by display 204 or audio playback to the user and confirmation, prior to transmission over the communication link or to the external system.

The content of some or all of the transmissions is preferably stored in a memory 212.

Figure 5B:
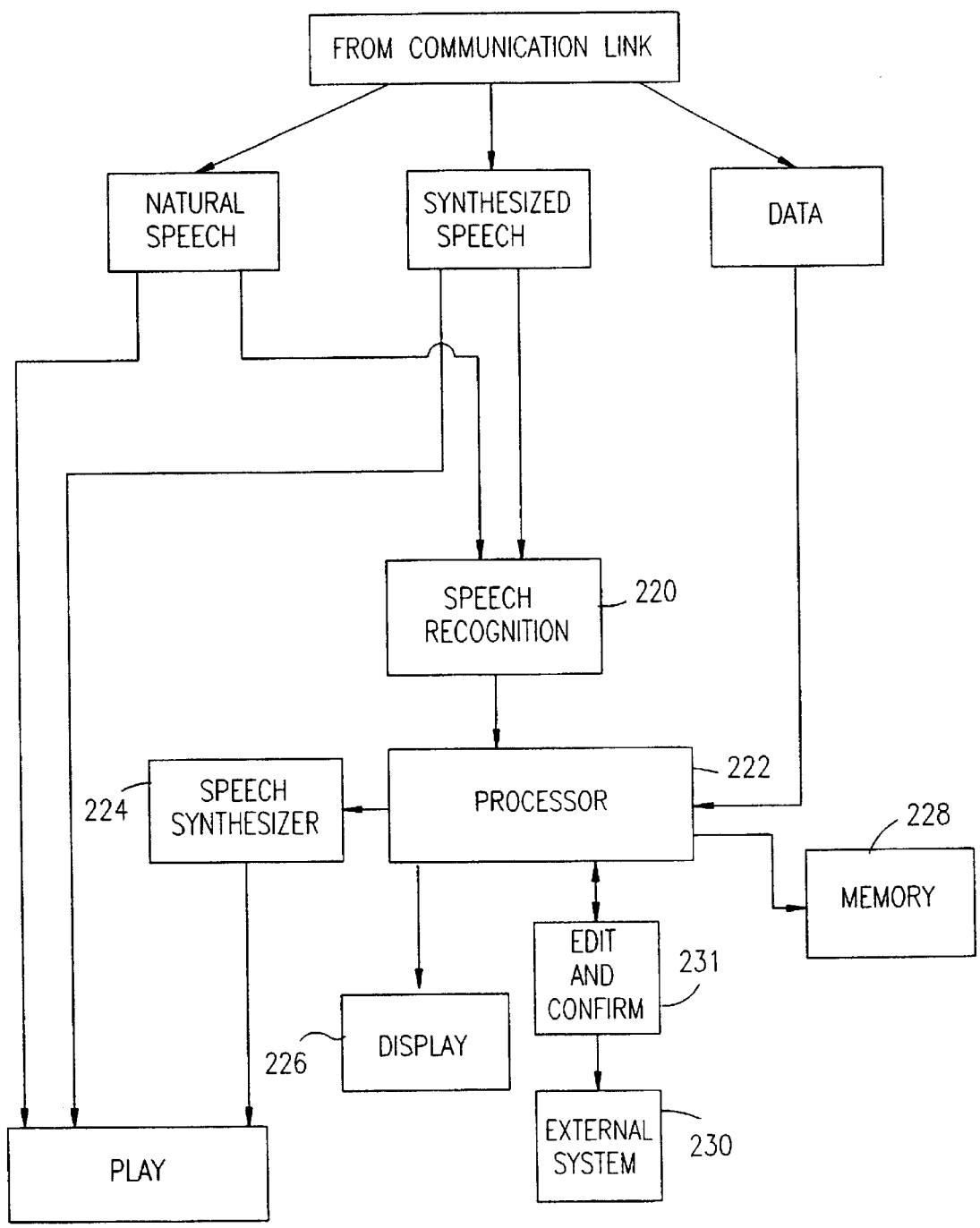

Reference is now made to FIG. 5B, which is a flowchart illustrating typical operation of the system of FIGS. 1–4B for message receipt. There may be received over the communication link a message in any one or more of the following forms: natural speech, synthetic speech or data. If and when natural speech is received it may be played immediately, as in a conventional aircraft communication system. Additionally or alternatively, it may be supplied to speech recognition circuitry 220.

If and when synthetic speech is received over the communication link it may be played immediately, as in a conventional system. Additionally or alternatively, it may be supplied to speech recognition circuitry 220.

The output of the speech recognition circuitry 220 is preferably processed by a processor 222, which also may process data which is received over the communication link. An output of processor 222 is preferably supplied to speech synthesizer circuitry 224 for producing a synthesized speech output, which may be immediately played. A visually sensible output of processor 222 is also preferably supplied to a display 226, such as display 20 (FIG. 1) or display 50 (FIG. 2) for providing a visually sensible display of the content of the natural or synthetic speech or data received over the communication link. A further output of the processor 222 may be stored in a memory 228.

Should there be a desired to possibly supply inputs to external systems 230, such as aircraft avionics, the operator may view appropriate data on display 226 and then edit and confirm transmission thereof to such external systems.

It will be appreciated by persons skilled in the art that the present invention may be embodied in a number of alternative forms. For example in accordance with one embodiment of the present invention, the transmit side both in aircraft and in controllers stations may only provide natural voice outputs. In such a case, the communications link will carry only natural voice outputs, as is the case in the prior art. In such a case, the receive side in at least the aircraft and preferably also in the controller's station, will have the functionality of natural speech recognition and display in a visually sensible form of the information content thereof. The receive side may also, of course, have the functionality of synthetic speech generation for providing a synthetic speech output to the listener.

In accordance with another embodiment of the present invention, the transmit side both in aircraft and in controllers stations may provide natural voice and/or synthetic voice outputs. In such a case, the communications link will carry only natural voice and synthetic voice outputs, as is the case in the prior art. In such a case, the receive side in at least the aircraft and preferably also in the controller's station, will have the functionality of natural speech and synthetic speech recognition and display in a visually sensible form of the information content of the received natural or synthetic speech. The receive side may also, of course, have the functionality of synthetic speech generation for providing a synthetic speech output to the listener.

In accordance with yet another embodiment of the present invention, the transmit side both in aircraft and in controllers stations may provide natural voice and/or synthetic voice outputs, as well as data outputs, and may transmit the synthetic speech output in data form. In such a case, the communications link will carry any one or more of natural voice, synthetic voice, and data outputs, as is not the case in the prior art. In such a case, the receive side in at least the aircraft and preferably also in the controller's station, will have the functionality of natural speech and synthetic speech recognition and data processing as well as display in a visually sensible form of the information content of the received natural or synthetic speech and or the data. The receive side may also, of course, have the functionality of synthetic speech generation for providing a synthetic speech output to the listener.

It may be appreciated that the present invention may employ existing communication links and an existing display and may be embodied solely or partially in software that provides the functionality of the present invention in connection with existing hardware.

It will be appreciated by persons skilled in the art that the present invention is not limited by what has been particularly shown and described hereinabove. Rather the scope of the present invention includes both combinations and subcombinations of the various features described hereinabove and shown in the drawings as well as modifications and further developments thereof which would occur to a person of ordinary skill in the art upon reading the foregoing description and which are not in the prior art.

What is claimed is:

1. A system for providing unambiguous communication between an aircraft pilot and at least one other communicator, the system comprising:

a communication link enabling communication between said at least one pilot and said at least one other communicator, said communication link having at least one transmit side and at least one receive side;

at least one speech recognizer located at said at least one transmit side for receiving speech and transmitting digital data representing said speech along said communication link to said receive side;

a visually sensible display at said receive side for receiving, over said communication link, said digital data and utilizing said digital data for providing a visually sensible output indication to at least one of the other communicator and the pilot of information communicated along said communication link; and a speech output device associated with said display for providing a natural speech output generally simultaneously with said visually sensible output indication to at least one of the other communicator and the pilot of information communicated along said communication link.

2. A system according to claim 1 and wherein the display is located within a field of view of a pilot and is operative to display information communicated from an aircraft controller to said pilot.

3. A system according to claim 1 and wherein the display is located within a field of view of a pilot and is operative to display information communicated from another pilot to said pilot.

4. A system according to claim 1 and wherein the display is located within a field of view of an aircraft controller and is operative to display information communicated from a pilot to said aircraft controller.

5. A system according to claim 1 and also comprising a microphone for receiving a voice input to be transmitted over said communication link.

6. A system according to claim 1 and also comprising a speech synthesizer associated with said display for providing a synthesized speech output generally simultaneously with said visually sensible output indication to at least one of the other communicator and the pilot of information communicated along said communication link.

7. A system according to claim 1 and also comprising a speech synthesizer associated with said display for providing a synthesized voice output generally simultaneously with said visually sensible output indication to at least one of the other communicator and the pilot of information communicated along said communication link, said speech synthesizer receiving an input in data form from said communication link.

8. A system according to claim 1 and also comprising a speech synthesizer associated with said display for providing a synthesized voice output generally simultaneously with said visually sensible output indication to at least one of the aircraft controller and the pilot of information communicated along said communication link, said speech synthesizer receiving a digital information output from said speech recognizer.

9. A system according to claim 1 and wherein said communication link also carries speech.

10. A system according to claim 1 and also comprising a memory for storing at least part of the information communicated along said communication link.

11. A system according to claim 1 and also comprising interface apparatus linking said system to external aviation-related systems for at least one of monitoring and control of the operation thereof.

12. A system according to claim 1 and wherein said communication link comprises a multiple channel link and said display is capable of displaying information received simultaneously along multiple channels.

13. A system according to claim 1 and also comprising a post flight analyzer utilizing at least part of the information communicated along said communication link.

14. A system according to claim 1 and also comprising a post event analyzer utilizing at least part of the information communicated along said communication link.

15. A system for providing unambiguous communication between an aircraft pilot and at least one other communicator along a communication link having at least one transmit side and at least one receive side, the system comprising:

an interface with said communication link;

a visually sensible display receiving information transmitted between said aircraft pilot and said at least one other communicator along said communication link via said interface and providing a visually sensible output indication to at least one of the other communicator and the pilot of information communicated along said communication link, which said visually sensible output indication utilizes data prepared at said at least one transmit side of said communication link; and a speech output device associated with said display for providing a natural speech output generally simultaneously with said visually sensible output indication to at least one of the other communicator and the pilot of information communicated along said communication link.

16. A system according to claim 15 and wherein the display is located within a field of view of a pilot and is operative to display information communicated from an aircraft controller to said pilot.

17. A system according to claim 15 and wherein the display is located within a field of view of a pilot and is operative to display information communicated from another pilot to said pilot.

18. A system according to claim 15 and wherein the display is located within a field of view of an aircraft controller and is operative to display information communicated from a pilot to said aircraft controller.

19. A system according to claim 15 and also comprising a microphone for receiving a voice input to be transmitted over said communication link.

20. A system according to claim 19 and also comprising a speech recognizer at said at least one transmit side for deriving information from said voice input received by said microphone.

21. A system according to claim 20 and also comprising a speech synthesizer associated with said display for providing a synthesized voice output generally simultaneously with said visually sensible output indication to at least one of the aircraft controller and the pilot of information communicated along said communication link, said speech synthesizer receiving a digital information output from said speech recognizer.

22. A system according to claim 15 and also comprising a speech synthesizer associated with said display for providing a synthesized speech output generally simultaneously with said visually sensible output indication to at least one of the other communicator and the pilot of information communicated along said communication link.

23. A system according to claim 15 and also comprising a speech synthesizer associated with said display for providing a synthesized voice output generally simultaneously with said visually sensible output indication to at least one of the other communicator and the pilot of information communicated along said communication link, said speech synthesizer receiving an input in data form from said communication link.

24. A system according to claim 15 and wherein said communication link also carries speech.

25. A system according to claim 15 and also comprising a memory for storing at least part of the information communicated along said communication link.

26. A system according to claim 15 and also comprising interface apparatus linking said system to external aviation-related systems for at least one of monitoring and control of the operation thereof.

27. A system according to claim 15 and wherein said communication link comprises a multiple channel link and said display is capable of displaying information received simultaneously along multiple channels.

28. A system according to claim 15 and also comprising a post flight analyzer utilizing at least part of the information communicated along said communication link.

29. A system according to claim 15 and also comprising a post event analyzer utilizing at least part of the information communicated along said communication link.

30. A system for providing unambiguous communication between an aircraft pilot and at least one other communicator along a communication link comprising at least one transmit side and at least one receive side, in an environment including a display, the system comprising:
   an interface with said communication link;
   circuitry operating a visually sensible display receiving information transmitted between said aircraft pilot and said at least one other communicator along said communication link via said interface and providing a visually sensible output indication, utilizing data prepared at said at least one transmit side, to at least one of the other communicator and the pilot of information communicated along said communication link; and
   a speech output device associated with said display for providing a natural speech output generally simultaneously with said visually sensible output indication to at least one of the other communicator and the pilot of information communicated along said communication link.

31. A system according to claim 30 and wherein the display is located within a field of view of a pilot and is operative to display information communicated from an aircraft controller to said pilot.

32. A system according to claim 30 and wherein the display is located within a field of view of a pilot and is operative to display information communicated from another pilot to said pilot.

33. A system according to claim 30 and wherein the display is located within a field of view of an aircraft controller and is operative to display information communicated from a pilot to said aircraft controller.

34. A system according to claim 30 and also comprising a microphone for receiving a voice input to be transmitted over said communication link.

35. A system according to claim 34 and also comprising a speech recognizer at said at least one transmit side for deriving information from said voice input received by said microphone.

36. A system according to claim 35 and also comprising a speech synthesizer associated with said display for providing a synthesized voice output generally simultaneously with said visually sensible output indication to at least one of the aircraft controller and the pilot of information communicated along said communication link, said speech synthesizer receiving a digital information output from said speech recognizer.

37. A system according to claims 30 and also comprising a speech synthesizer associated with said display for providing a synthesized speech output generally simultaneously with said visually sensible output indication to at least one of the other communicator and the pilot of information communicated along said communication link.

38. A system according to claim 30 and also comprising a speech synthesizer associated with said display for providing a synthesized voice output generally simultaneously with said visually sensible output indication to at least one of the other communicator and the pilot of information communicated along said communication link, said speech synthesizer receiving an input in data form from said communication link.

39. A system according to claim 30 and wherein said communication link also carries speech.

40. A system according to claim 30 and also comprising a memory for storing at least part of the information communicated along said communication link.

41. A system according to claim 30 and also comprising interface apparatus linking said system to external aviation-related systems for at least one of monitoring and control of the operation thereof.

42. A system according to claim 30 and wherein said communication link comprises a multiple channel link and said display is capable of displaying information received simultaneously along multiple channels.

43. A system according to claim 30 and also comprising a post flight analyzer utilizing at least part of the information communicated along said communication link.

44. A system according to claim 30 and also comprising a post event analyzer utilizing at least part of the information communicated along said communication link.

45. A method for providing unambiguous communication between an aircraft pilot and at least one other communicator, the method comprising:
   enabling communication between said pilot and said at least one other communicator along a communication link comprising at least one transmit side and at least one receive side;
   preparing data for a visually sensible output indication of said communication at said at least one transmit end;
   providing said visually sensible output indication on a display to at least one of the other communicator and the pilot of information communicated along said communication link, based on said data; and
   providing a natural speech output generally simultaneously with said visually sensible output indication to at least one of the other communicator and the pilot of information communicated along said communication link.

46. A method according to claim 45 and wherein the display is located within a field of view of a pilot and is operative to display information communicated from an aircraft controller to said pilot.

47. A method according to claim 45 and wherein the display is located within a field of view of an aircraft controller and is operative to display information communicated from a pilot to said aircraft controller.

48. A method according to claim 45 and wherein the display is located within a field of view of a pilot and is operative to display information communicated from another pilot to said pilot.

49. A method according to claim 45 and also comprising receiving a voice input to be transmitted over said communication link.

50. A method according to claim 49 and also comprising deriving information from said voice input at said transmit side.

51. A method according to claim 50 and also comprising providing a synthesized voice output generally simultaneously with said visually sensible output indication to at least one of the aircraft controller and the pilot of information communicated along said communication link in response to digital information output from a speech recognizer at said transmit side.

52. A method according to claim 45 and also comprising providing a synthesized speech output generally simultaneously with said visually sensible output indication to at least one of the other communicator and the pilot of information communicated along said communication link.

53. A method according to claim 45 and also comprising providing a synthesized voice output generally simultaneously with said visually sensible output indication to at least one of the other communicator and the pilot of information communicated along said communication link, in response to a received input in data form from said communication link.

54. A method according to claim 45 and wherein said communication link also carries speech.

55. A method according to claim 45 and also comprising a memory for storing at least part of the information communicated along said communication link.

56. A method according to claim 45 and also comprising linking said communication link to external aviation-related systems for at least one of monitoring and control of the operation thereof.

57. A method according to claim 45 and wherein said communication link comprises a multiple channel link and said display is capable of displaying information received simultaneously along multiple channels.

58. A method according to claim 45 and also comprising utilizing at least part of the information communicated along said communication link for post-flight analysis.

59. A method according to claim 45 and also comprising utilizing at least part of the information communicated along said communication link for post-event analysis.

60. A method for providing unambiguous communication between an aircraft pilot and at least one other communicator along a communication link having at least one transmit side and at least one receive side, the method comprising:

interfacing with said communication link;
preparing data for a visually sensible display of information transmitted, at said at least one transmit end;
providing said visually sensible display of information transmitted between said aircraft pilot and said at least one other communicator along said communication link to at least one of the other communicator and the pilot of information communicated along said communication link, based on said data; and
providing a natural speech output generally simultaneously with said visually sensible output indication to at least one of the other communicator and the pilot of information communicated along said communication link.

61. A method according to claim 60 and wherein the display is located within a field of view of a pilot and is operative to display information communicated from an aircraft controller to said pilot.

62. A method according to claim 60 and wherein the display is located within a field of view of an aircraft controller and is operative to display information communicated from a pilot to said aircraft controller.

63. A method according to claim 60 and wherein the display is located within a field of view of a pilot and is operative to display information communicated from another pilot to said pilot.

64. A method according to claim 60 and also comprising receiving at least a voice input to be transmitted over said communication link.

65. A method according to claim 64 and also comprising deriving information from said voice input at said transmit side.

66. A method according to claim 65 and also comprising providing a synthesized voice output generally simultaneously with said visually sensible output indication to at least one of the aircraft controller and the pilot of information communicated along said communication link in response to a digital information output from a speech recognizer at said transmit side.

67. A method according to claim 60 and also comprising providing a synthesized speech output generally simultaneously with said visually sensible output indication to at least one of the other communicator and the pilot of information communicated along said communication link.

68. A method according to claim 60 and also comprising providing a synthesized voice output generally simultaneously with said visually sensible output indication to at least one of the other communicator and the pilot of information communicated along said communication link, in response to a received input in data form from said communication link.

69. A method according to claim 60 and wherein said communication link also carries speech.

70. A method according to claim 60 and also comprising a memory for storing at least part of the information communicated along said communication link.

71. A method according to claim 60 and also comprising linking said communication link to external aviation-related systems for at least one of monitoring and control of the operation thereof.

72. A method according to claim 60 and wherein said communication link comprises a multiple channel link and said display is capable of displaying information received simultaneously along multiple channels.

73. A method according to claim 60 and also comprising utilizing at least part of the information communicated along said communication link for post-flight analysis.

74. A method according to claim 60 and also comprising utilizing at least part of the information communicated along said communication link for post-event analysis.

75. A method for providing unambiguous communication between an aircraft pilot and at least one other communicator along a communication link having at least one transmit side and at least one receive side, in an environment including a display, the method comprising:

interfacing with said communication link;
preparing data for a visually sensible output indication of information to be transmitted over said communication link, at said at least one transmit end;
operating a visually sensible display receiving information transmitted between said aircraft pilot and said at least one other communicator along said communication link and providing said visually sensible output indication to at least one of the other communicator and the pilot of information communicated along said communication link, based on said data; and providing a natural speech output generally simultaneously with said visually sensible output indication to at least one of the other communicator and the pilot of information communicated along said communication link.

76. A method according to claim 75 and wherein the display is located within a field of view of a pilot and is operative to display information communicated from an aircraft controller to said pilot.

77. A method according to claim 75 and wherein the display is located within a field of view of an aircraft controller and is operative to display information communicated from a pilot to said aircraft controller.

78. A method according to claim 75 and wherein the display is located within a field of view of a pilot and is operative to display information communicated from another pilot to said pilot.

79. A method according to claim 75 and also comprising receiving at least a voice input to be transmitted over said communication link.

80. A method according to claim 79 and also comprising deriving information from said voice input at said transmit side.

81. A method according to claim 80 and also comprising providing a synthesized voice output generally simultaneously with said visually sensible output indication to at least one of the aircraft controller and the pilot of information communicated along said communication link in response to a digital information output from a speech recognizer at said transmit side.

82. A method according to claim 75 and also comprising providing a synthesized speech output generally simultaneously with said visually sensible output indication to at least one of the other communicator and the pilot of information communicated along said communication link.

83. A method according to claim 75 and also comprising providing a synthesized voice output generally simultaneously with said visually sensible output indication to at least one of the other communicator and the pilot of information communicated along said communication link, in response to a received input in data form from said communication link.

84. A method according to claim 75 and wherein said communication link also carries speech.

85. A method according to claim 75 and also comprising a memory for storing at least part of the information communicated along said communication link.

86. A method according to claim 75 and also comprising linking said communication link to external aviation-related systems for at least one of monitoring and control of the operation thereof.

87. A method according to claim 75 and wherein said communication link comprises a multiple channel link and said display is capable of displaying information received simultaneously along multiple channels.

88. A method according to claim 75 and also comprising utilizing at least part of the information communicated along said communication link for post-flight analysis.

89. A method according to claim 75 and also comprising utilizing at least part of the information communicated along said communication link for post-event analysis.

* * * * *